(12) United States Patent
Morikaku et al.

(10) Patent No.: US 6,674,192 B2
(45) Date of Patent: Jan. 6, 2004

(54) DYNAMOELECTRIC MACHINE

(75) Inventors: Hideki Morikaku, Tokyo (JP);
Yoshinobu Utsumi, Tokyo (JP);
Katsuhiko Kusumoto, Tokyo (JP);
Atsushi Oohashi, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/216,566

(22) Filed: Aug. 12, 2002

(65) Prior Publication Data

US 2003/0042813 A1 Mar. 6, 2003

(30) Foreign Application Priority Data

Aug. 20, 2001 (JP) ........................................ 2001-248806

(51) Int. Cl.$^7$ ................................................ H02K 7/00
(52) U.S. Cl. ........................ 310/68; 310/68 R; 310/66; 310/67; 310/69
(58) Field of Search .................................. 310/68 R, 66, 310/69

(56) References Cited

U.S. PATENT DOCUMENTS 6,373,155 B1 * 4/2002 Shimizu ................... 310/68 B

FOREIGN PATENT DOCUMENTS

JP 9-065620 3/1997

* cited by examiner

Primary Examiner—Nicholas Ponomarenko
Assistant Examiner—Iraj A. Mohandesi
(74) Attorney, Agent, or Firm—Sughrue Mion, PLLC

(57) ABSTRACT

Slip rings are fixed to an outer circumference of a shaft axially inside a rear-end bearing, brushes are disposed so as to contact outer circumferential surfaces of the slip rings, a sensor rotor of a rotation detecting apparatus is fixed to an end portion of the shaft projecting axially outside the rear-end bearing, and a sensor unit is disposed in close proximity to the sensor rotor.

12 Claims, 13 Drawing Sheets

FIG. 5A   FIG. 5B   FIG. 5C
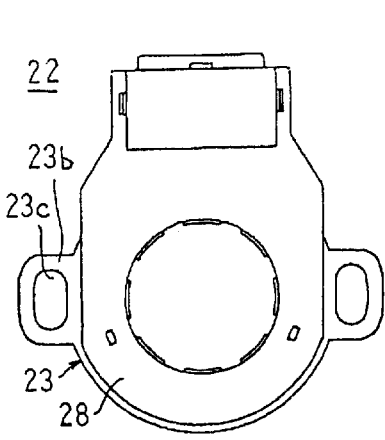 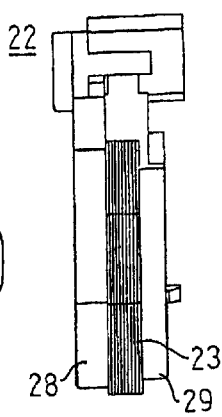 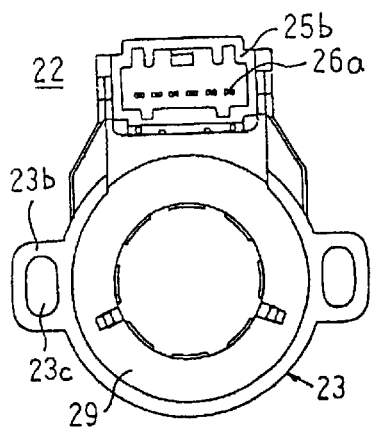
FIG. 6A   FIG. 6B   FIG. 6C
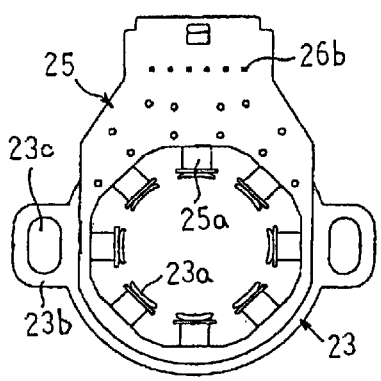 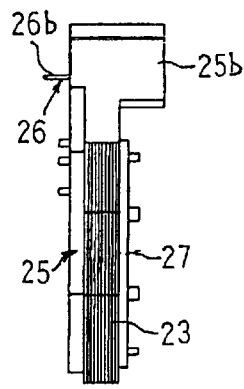 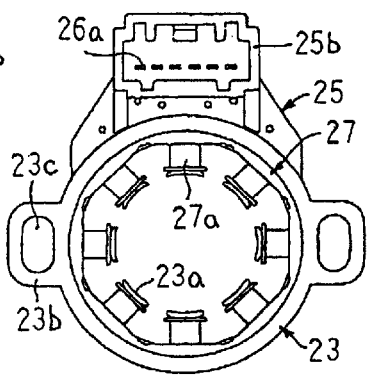
FIG. 7A   FIG. 7B
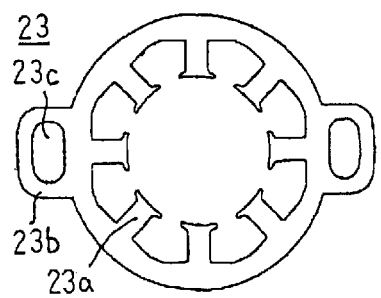 

FIG. 9A   FIG. 9B
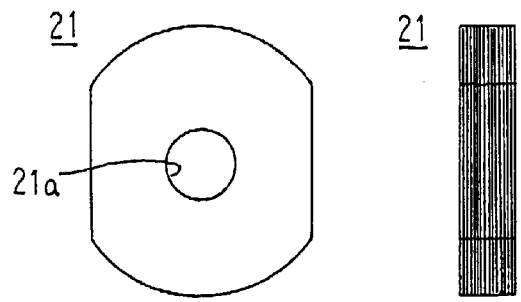
FIG. 10A   FIG. 10B
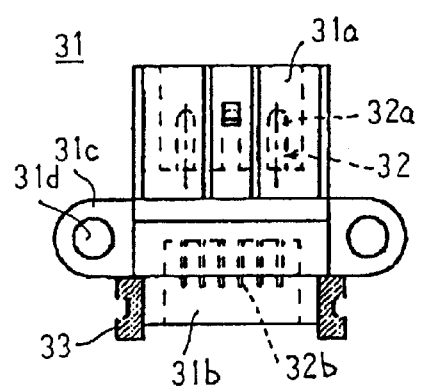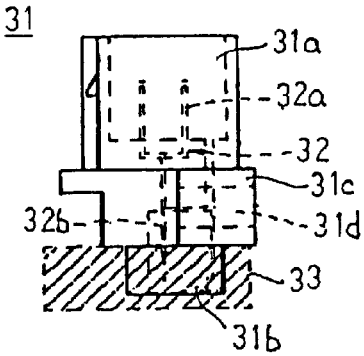
FIG. 11
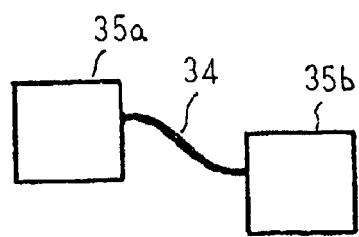

FIG. 17
PRIOR ART
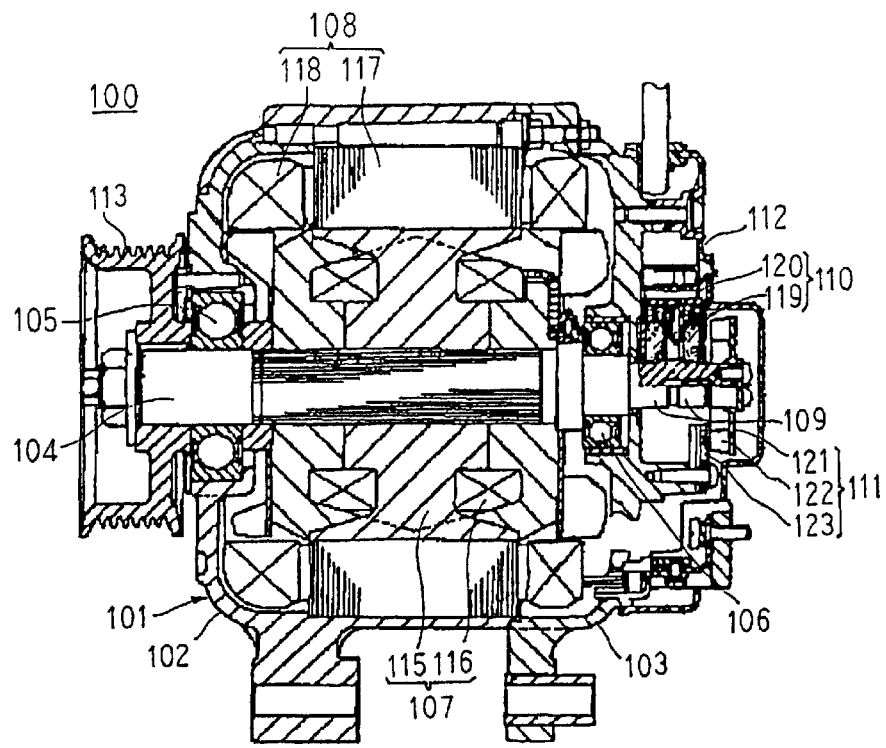
FIG. 18A
PRIOR ART
FIG. 18B
PRIOR ART
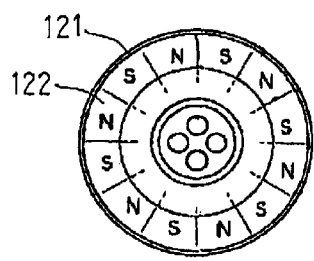 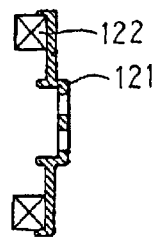
FIG. 19
PRIOR ART
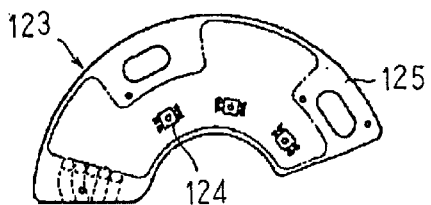

DYNAMOELECTRIC MACHINE

BACKGROUND OF THE INVENTION

1. Field of the Invention

The present invention relates to a dynamoelectric machine in which a contacted part such as a slip ring, a commutator, etc., and a brush slide in contact, and particularly relates to a dynamoelectric machine such as an automotive alternator, an automotive electric motor, an automotive generator-motor, etc., provided with a rotation detecting apparatus for detecting a rotational position of a rotor.

2. Description of the Related Art

A conventional automotive generator-motor 100, as shown in FIG. 17, is provided with: a housing 101 composed of a generally cup-shaped front bracket 102 and rear bracket 103; a shaft 104 rotatably supported in the housing 101 by means of front-end and rear-end bearings 105 and 106; a rotor 107 fixed to the shaft 104 and rotatably disposed inside the housing 101; a stator 108 held by an inner wall surface of the housing 101 so as to surround the rotor 107; a pair of slip rings 109 disposed on an outer circumference of an end portion of the shaft 104 projecting beyond the rear-end bearing 106; a brush apparatus 110 disposed on an outer circumference of the slip rings 109; a rotor position detecting apparatus 111 for detecting a relative position of the rotor 107 relative to the stator 108; a rear cover 112 securely fastened to the rear bracket 103 so as to cover the brush apparatus 110 and the rotor position detecting apparatus 111; and a pulley 113 fixed to a front-end end portion of the shaft 104.

The rotor 107 is provided with: Lundell-type pole cores 115 fixed to the shaft 104; and rotor coils 116 installed in the pole cores 115.

The stator 108 is provided with: a stator core 117 disposed so as to be held between the front bracket 102 and the rear bracket 103 and surround the rotor 107; and a three-phase stator coil 118 installed in the stator core 117.

The brush apparatus 110 is provided with: a pair of brushes 119 sliding in contact with outer circumferential surfaces of the pair of slip rings 109; and a brush holder 120 for housing the brushes 119.

The rotor position detecting apparatus 111, as shown in FIGS. 18A, 18B, and 19, is provided with a magnetic pole holding plate 121, magnetic sensor poles 122, and a position sensor 123. The magnetic pole holding plate 121 is prepared into a disk shape using a ferromagnetic material, is securely fastened to a rear-end end surface of the shaft 104, and rotates with the shaft 104. The magnetic sensor poles 122 are constituted by an annular permanent magnet, being magnetized with South-seeking (S) poles and North-seeking (N) poles alternately at a uniform pitch in a circumferential direction. The magnetic sensor poles 122 are fixed to the magnetic pole holding plate 121 by means of an adhesive, etc., being disposed so as to cover a rear-end end portion of the shaft 104 in an annular shape. The position sensor 123 is constituted by a generally fan-shaped printed circuit board 125, etc., on which an electronic circuit including three Hall elements 124 is formed. The position sensor 123 is securely fastened to an end surface of the rear bracket 103 such that the Hall elements 124 face the magnetic sensor poles 122 in close proximity thereto.

Operation of the automotive generator-motor 100 constructed in this manner when used as an electric motor will now be explained.

During starting of an engine, an alternating current is supplied sequentially to each phase of the three-phase stator coil 118 by a three-phase drive circuit (not shown), and a direct current is supplied to the rotor coil 116 by means of the brushes 119 and the slip rings 109. Thus, the stator coil 118 and the rotor coil 116 become electromagnets, and the rotor 107 rotates inside the stator 108 together with the shaft 104. Torque from the shaft 104 is transmitted to an output shaft of the engine by means of the pulley 113, starting the engine.

At this time, the magnetic sensor poles 122 rotate together with the rotation of the shaft 104. Changes in magnetic flux due to rotation of the magnetic sensor poles 122 are detected by the position sensor 123 and output to an external control apparatus (not shown) as rotor position signals. The control apparatus into which the rotor position signals are input controls the alternating current supplied sequentially to each of the phases of the three-phase stator coil 118 such that the direction of rotation of the rotor 107 is constant and a predetermined rotational frequency is achieved.

Next, operation of the automotive generator-motor 100 when used as a generator will be explained.

When an engine is started, torque from the engine is transmitted to the shaft 104 by means of the pulley 113, rotating the shaft 104. Thus, when a direct current is supplied to the rotor coil 116 by means of the brushes 119 and the slip rings 109, the rotor coil 116 is excited and becomes an electromagnet. By rotating the rotor 107 inside the stator 108 in this state, an alternating current is induced sequentially in the stator coil 118 installed in the stator core 117 and a generated voltage rises rapidly. This three-phase alternating current is input into a three-phase rectifying circuit (not shown) and is rectified into a direct current. The direct-current voltage rectified by the three-phase rectifying circuit charges a battery and is supplied to an electric load.

In a conventional automotive generator-motor, because the brush apparatus 110 and the rotor position detecting apparatus 111 are disposed adjacent to an end portion of the shaft 104 projecting beyond the rear-end bearing 106 as explained above, one problem has been that abraded brush dust arising due to the sliding of the brushes 119 on the slip rings 109 may penetrate the gaps between the Hall elements 124 and the magnetic sensor poles 122 which are disposed in close proximity, preventing the rotor position detecting apparatus 111 from stably detecting the changes in the magnetic flux.

SUMMARY OF THE INVENTION

The present invention aims to solve the above problems and an object of the present invention is to provide a dynamoelectric machine enabling an angular position of a rotor to be detected with high precision by disposing contacts and a rotation detecting apparatus with a bearing interposed to prevent abrasion dust arising due to sliding motion between a contact and a contacted part from penetrating into the rotation detecting apparatus.

With the object in view, the dynamoelectric machine of the present invention includes a housing, a first bearing disposed in a first axial end portion of the housing, a second bearing disposed in a second axial end portion of the housing and a shaft rotatably supported in the housing by means of the first and second bearings. Further, the dynamoelectric machine includes a rotor composed of a rotor core fixed to the shaft and rotatably disposed inside the housing and a rotor coil installed in the rotor core, a stator composed of a stator core supported in the housing so as to surround an outer circumference of the rotor and a stator coil installed in the stator core, a contacted part fixed to an outer circumference of the shaft axially inside the first bearing and electrically connected to the rotor coil, and a contact disposed so as to contact an outer circumferential surface of the contacted part. Still further, the dynamoelectric machine includes a rotation detecting apparatus composed of a sensor rotor fixed to an end portion of the shaft projecting axially outside the first bearing, a sensor unit disposed in close proximity to the sensor rotor, and a connector unit for delivering input and output signals to and from the sensor unit.

Therefore, abrasion dust arising due to sliding motion between the contact and the contacted part does not penetrate into the rotation detecting apparatus, thereby providing a dynamoelectric machine enabling an angular position of the rotor to be detected with high precision.

BRIEF DESCRIPTION OF THE DRAWINGS

FIG. 5A is a front elevation explaining a construction of a sensor unit of the rotation detecting apparatus mounted to the automotive generator-motor according to Embodiment 1 of the present invention;

FIG. 5B is a side elevation explaining the construction of the sensor unit of the rotation detecting apparatus mounted to the automotive generator-motor according to Embodiment 1 of the present invention;

FIG. 5C is a rear elevation explaining the construction of the sensor unit of the rotation detecting apparatus mounted to the automotive generator-motor according to Embodiment 1 of the present invention;

FIG. 6A is a front elevation explaining a construction of a sensor assembly constituting the sensor unit of the rotation detecting apparatus according to Embodiment 1 of the present invention;

FIG. 6B is a side elevation explaining the construction of the sensor assembly constituting the sensor unit of the rotation detecting apparatus according to Embodiment 1 of the present invention;

FIG. 6C is a rear elevation explaining the construction of the sensor assembly constituting the sensor unit of the rotation detecting apparatus according to Embodiment 1 of the present invention;

FIG. 7A is a front elevation explaining a construction of a sensor core constituting the sensor unit of the rotation detecting apparatus according to Embodiment 1 of the present invention;

FIG. 7B is a side elevation explaining the construction of the sensor core constituting the sensor unit of the rotation detecting apparatus according to Embodiment 1 of the present invention;

FIG. 9A is a front elevation explaining a construction of a sensor rotor of the rotation detecting apparatus according to Embodiment 1 of the present invention;

FIG. 9B is a side elevation explaining the construction of the sensor rotor of the rotation detecting apparatus according to Embodiment 1 of the present invention;

FIG. 10A is a front elevation explaining a construction of a connector portion of the rotation detecting apparatus according to Embodiment 1 of the present invention;

FIG. 10B is a side elevation explaining the construction of the connector portion of the rotation detecting apparatus according to Embodiment 1 of the present invention;

FIG. 11 is a side elevation showing flexible wiring used in the rotation detecting apparatus according to Embodiment 1 of the present invention;

FIG. 17 is a longitudinal section showing a conventional automotive generator-motor;

FIG. 18A is a front elevation showing magnetic sensor poles of a rotor position detecting apparatus used in the conventional automotive generator-motor;

FIG. 18B is a side elevation showing magnetic sensor poles of the rotor position detecting apparatus used in the conventional automotive generator-motor; and FIG. 19 is a front elevation showing a position sensor of the rotor position detecting apparatus used in the conventional automotive generator-motor.

DETAILED DESCRIPTION OF THE PREFERRED EMBODIMENTS

Preferred embodiments of the present invention will now be explained with reference to the drawings.

Embodiment 1

Figure 1:
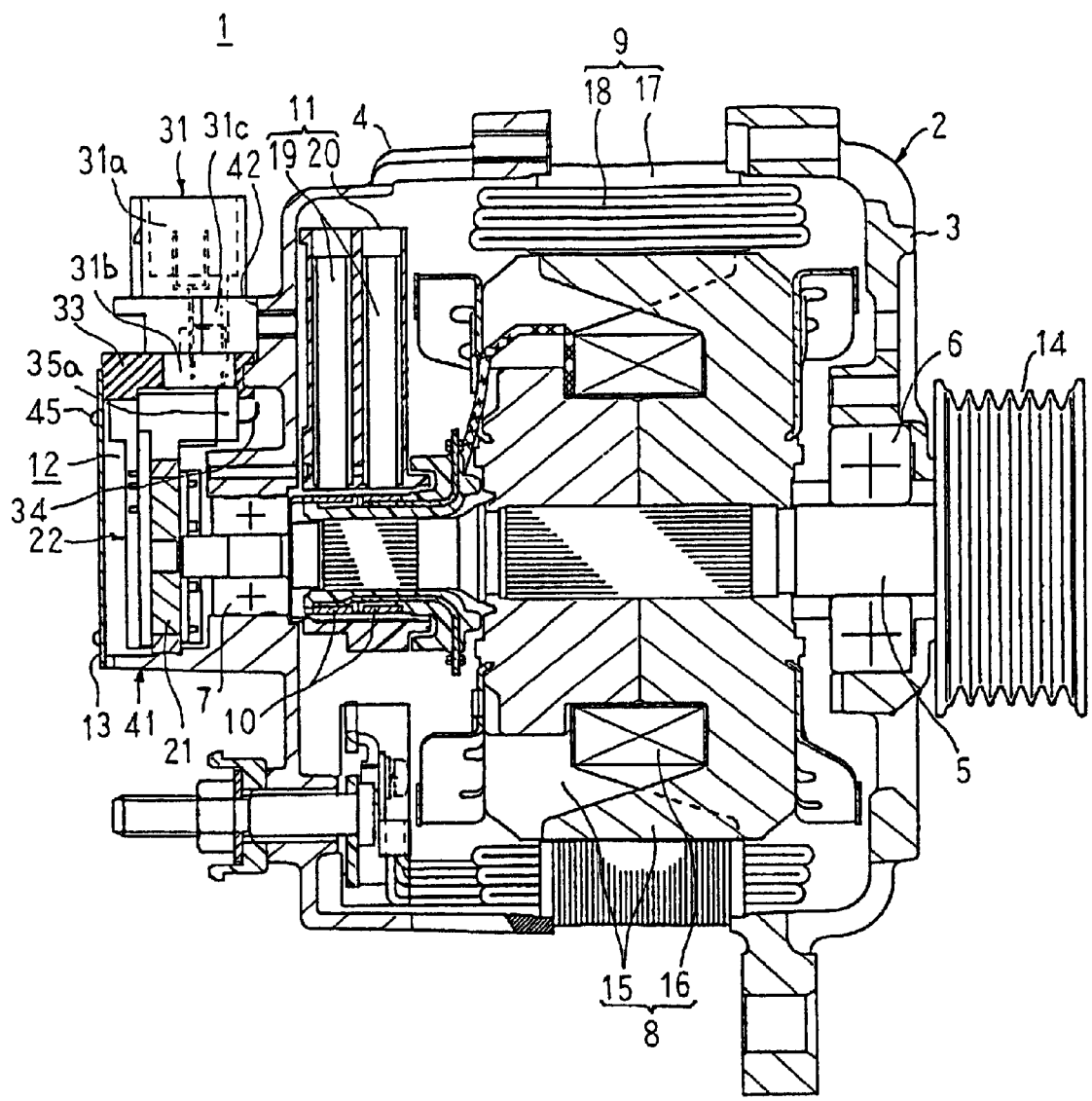
FIG. 1 is a longitudinal section showing an automotive generator-motor according to Embodiment 1 of the present invention.
Figure 2:
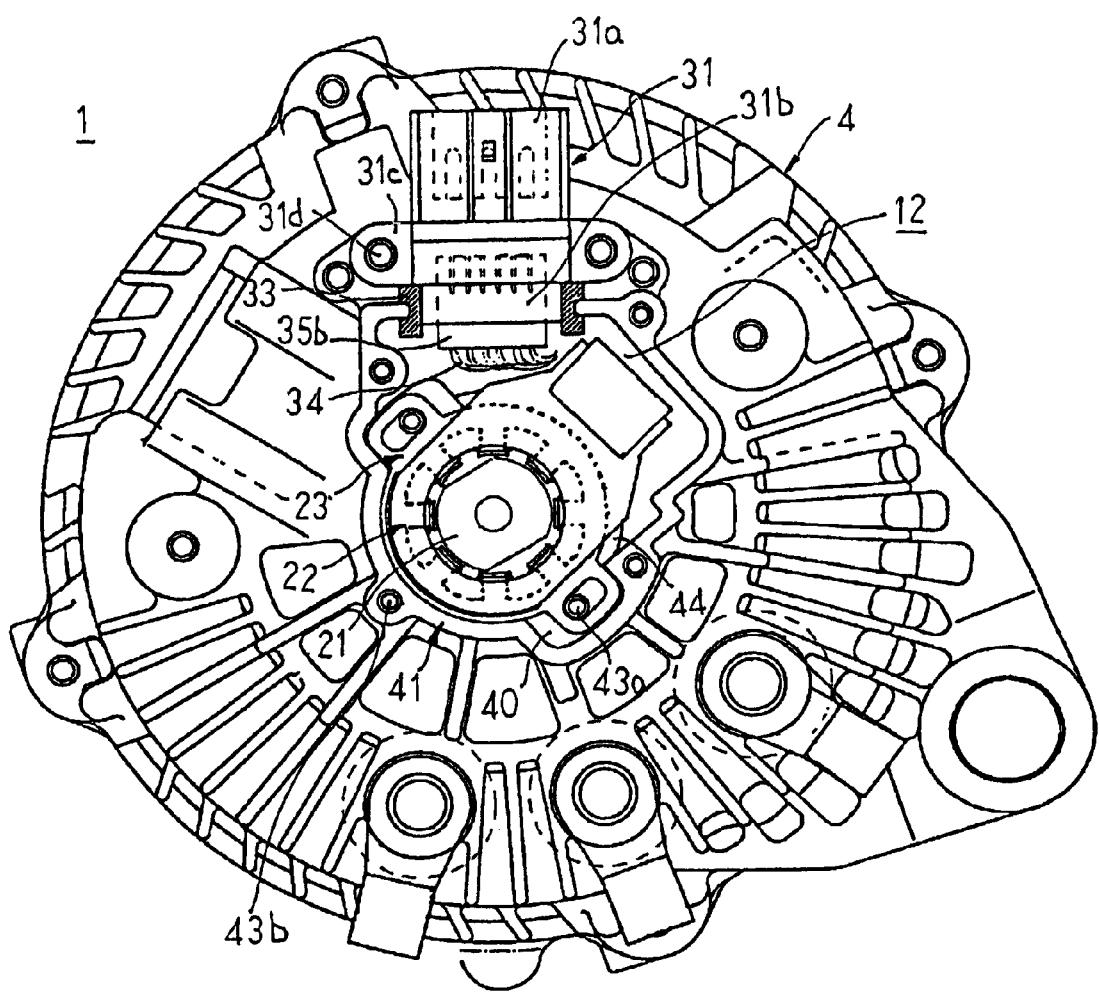
FIG. 2 is an end elevation showing the automotive generator-motor according to Embodiment 1 of the present invention from a rear end before an end plate is mounted.
Figure 3:
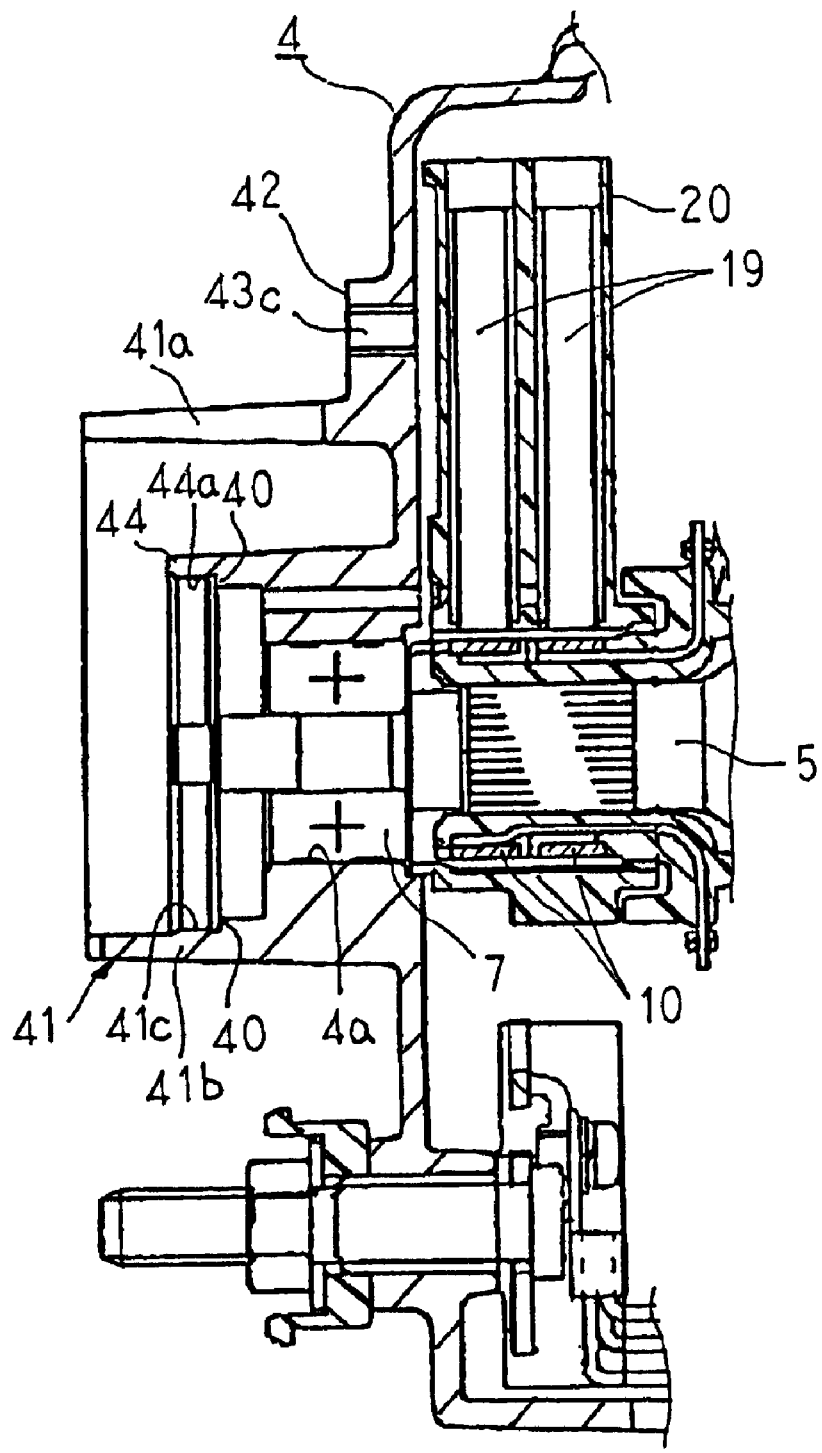
FIG. 3 is a partial cross section showing a vicinity of a rear-end bearing of the automotive generator-motor according to Embodiment 1 of the present invention before a rotation detecting apparatus is mounted.
Figure 4:
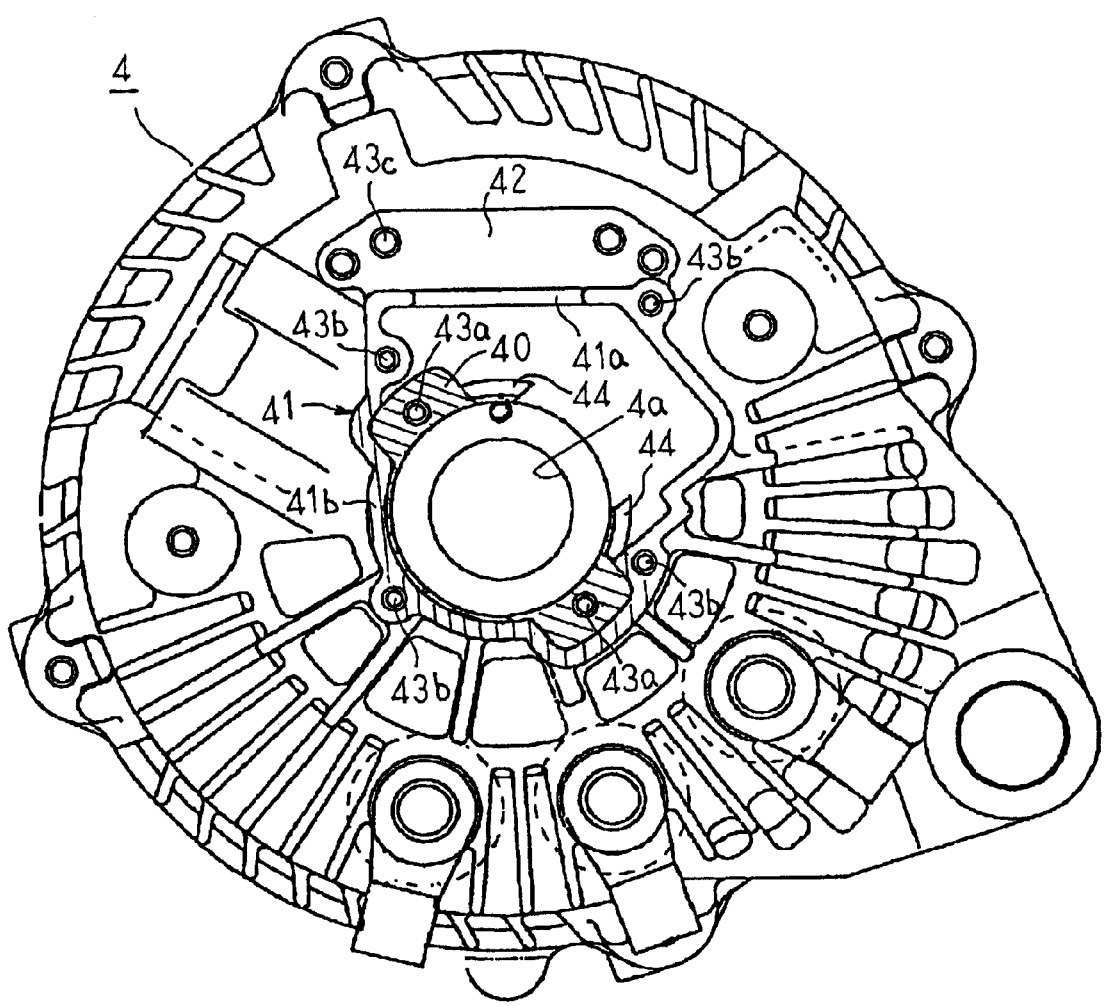
FIG. 4 is an end elevation showing the automotive generator-motor according to Embodiment 1 of the present invention from a rear end before a rotation detecting apparatus is mounted.
Figure 8A:
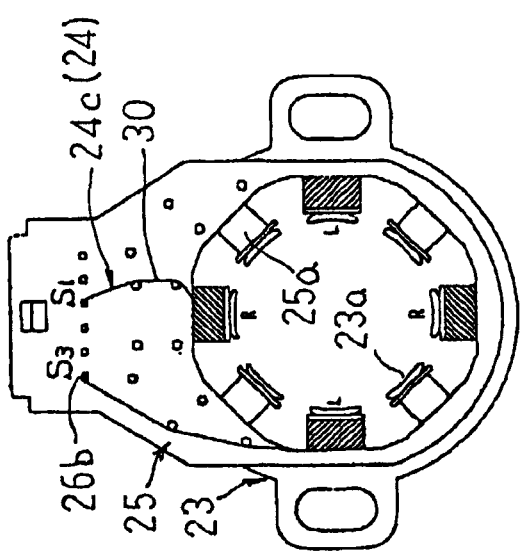
FIG. 8A is a diagram explaining a construction of a sensor coil constituting the sensor unit of the rotation detecting apparatus according to Embodiment 1 of the present invention.
Figure 8B:
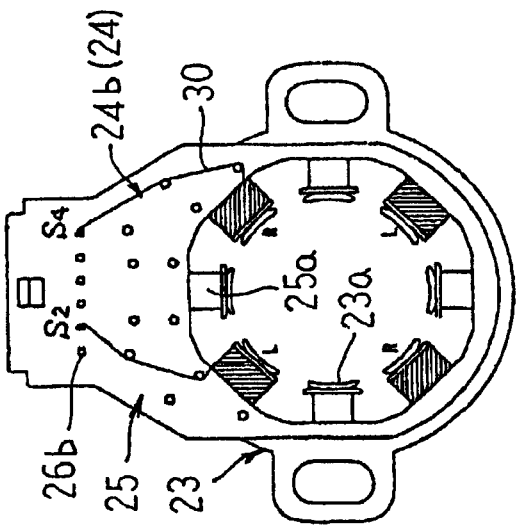
FIG. 8B is another diagram explaining the construction of the sensor coil constituting the sensor unit of the rotation detecting apparatus according to Embodiment 1 of the present invention.
Figure 8C:
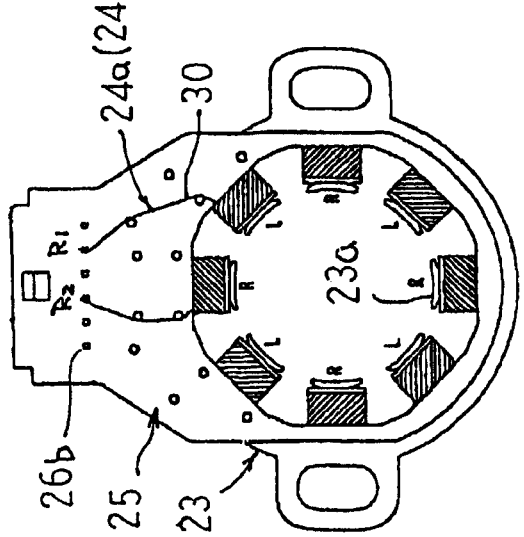
FIG. 8C is another diagram explaining the construction of the sensor coil constituting the sensor unit of the rotation detecting apparatus according to Embodiment 1 of the present invention.

FIG. 1 is a longitudinal section showing an automotive generator-motor according to Embodiment 1 of the present invention, FIG. 2 is an end elevation showing the automotive generator-motor according to Embodiment 1 of the present invention from a rear end before an end plate is mounted, FIG. 3 is a partial cross section showing a vicinity of a rear-end bearing of the automotive generator-motor according to Embodiment 1 of the present invention before a rotation detecting apparatus is mounted, and FIG. 4 is an end elevation showing the automotive generator-motor according to Embodiment 1 of the present invention from a rear end before a rotation detecting apparatus is mounted. FIGS. 5A to 5C are a front elevation, a side elevation, and a rear elevation, respectively, explaining a construction of a sensor unit of the rotation detecting apparatus mounted to the automotive generator-motor according to Embodiment 1 of the present invention. FIGS. 6A to 6C are a front elevation, a side elevation, and a rear elevation, respectively, explaining a construction of a sensor assembly constituting the sensor unit of the rotation detecting apparatus according to Embodiment 1 of the present invention. FIGS. 7A and 7B are a front elevation and a side elevation, respectively, explaining a construction of a sensor core constituting the sensor unit of the rotation detecting apparatus according to Embodiment 1 of the present invention. FIGS. 8A to 8C are diagrams explaining a construction of a sensor coil constituting the sensor unit of the rotation detecting apparatus according to Embodiment 1 of the present invention, FIG. 8A showing winding of an excitation coil, FIG. 8B showing winding of a first output coil, and FIG. 8C showing winding of a second output coil. FIGS. 9A and 9B are a front elevation and a side elevation, respectively, explaining a construction of a sensor rotor of the rotation detecting apparatus according to Embodiment 1 of the present invention. FIGS. 10A and 10B are a front elevation and a side elevation, respectively, explaining a construction of a connector portion of the rotation detecting apparatus according to Embodiment 1 of the present invention. FIG. 11 is a side elevation showing flexible wiring used in the rotation detecting apparatus according to Embodiment 1 of the present invention.

An automotive generator-motor 1 according to Embodiment 1 of the present invention, as shown in FIGS. 1 and 2, is provided with: a housing 2 composed of a front bracket 3 and a rear bracket 4, each being generally cup-shaped and composed of aluminum; a shaft 5 rotatably supported in the housing 2 by means of front-end and rear-end bearings 6 and 7; a rotor 8 fixed to the shaft 5 and rotatably disposed inside the housing 2; a stator 9 held by an inner wall surface of the housing 2 so as to surround the rotor 8; a pair of slip rings 10 functioning as a contacted part disposed on an outer circumference of the shaft 5 axially inside the rear-end bearing 7; a brush apparatus 11 disposed on an outer circumference of the slip rings 10; a rotation detecting apparatus 12 disposed axially outside the rear-end bearing 7 for detecting a relative position of the rotor 8 relative to the stator 9; an end plate 13 securely fastened to the rear bracket 4 so as to cover the rotation detecting apparatus 12; and a pulley 14 fixed to a front-end end portion of the shaft 5. Here, the rear-end bearing 7 corresponds to a first bearing, and the front-end bearing 6 corresponds to a second bearing.

The rotor 8 is provided with: a pair of Lundell-type pole cores 15 (a rotor core) fixed to the shaft 5; and a rotor coil 16 installed in the pole cores 15. The stator 9 is provided with: a stator core 17 disposed so as to be held between the front bracket 3 and the rear bracket 4 and surround the rotor 8; and a three-phase stator coil 18 installed in the stator core 17.

The brush apparatus 11 is provided with: a pair of brushes 19 functioning as a contact sliding in contact with outer circumferential surfaces of the pair of slip rings 10; and a brush holder 20 for housing the brushes 19.

Next, a construction of the rotation detecting apparatus 12 will be explained with reference to FIGS. 5A to 11.

The rotation detecting apparatus 12 is constituted by a sensor rotor 21, a sensor unit 22, a connector unit 31, flexible wiring 34 electrically connecting the sensor unit 22 and the connector unit 31, etc.

The sensor rotor 21, as shown in FIGS. 9A and 9B, is constructed by laminating and integrating a predetermined number of sheets of a magnetic material such as a carbon steel sheet, for example, formed by punching into a predetermined shape. An interfitting aperture 21a is disposed through a center of this sensor rotor 21. The external shape of the sensor rotor 21 is formed into a curve such that gap permeance between the sensor rotor 21 and a sensor core 23 described below changes sinusoidally with angle. The sensor rotor 21 is mounted by press-fitting the interfitting aperture 21a onto an end portion of the shaft 5 projecting beyond the rear-end bearing 7, as shown in FIGS. 1 and 2.

The sensor unit 22 includes: a sensor core 23; a sensor coil 24 installed in the stator core 23; an upper holding plate 25; a lower holding plate 27; an upper cover 28; a lower cover 29, etc.

The sensor core 23, as shown in FIGS. 7A and 7B, is constructed by laminating and integrating a predetermined number of sheets of a magnetic material such as a carbon steel sheet, for example, formed by punching into a predetermined shape. The sensor core 23 is formed into an annular shape, eight (first to eighth) teeth 23a projecting radially inward are formed at a uniform angular pitch in a circumferential direction, and a pair of flange portions 23b for mounting are disposed so as to extend radially outward from outer circumferential portions. Furthermore, elongated core-mounting apertures 23c are disposed through each of the flange portions 23b.

Insert conductors 26 are insert molded into the upper holding plate 25 using a resin such as a polybutylene terephthalate (PBT), etc., and as shown in FIGS. 6A, 6B, and 6C, first ends 26a of the insert conductors 26 are exposed inside a holding plate connector portion 25b to constitute input and output terminals. Electrically-insulating segments 25a having a square bracket ("[")-shaped cross section for covering upper surfaces and first and second side surfaces of the teeth 23a of the sensor core 23 are formed integrally on the upper holding plate 25.

The lower holding plate 27 is injection molded using a resin such as a PBT, etc., electrically-insulating segments 27a having a square bracket-shaped cross section for covering lower surfaces and first and second side surfaces of the teeth 23a of the sensor core 23 being formed integrally therewith as shown in FIGS. 6A, 6B, and 6C.

The upper cover 28 and the lower cover 29 are injection molded using a resin such as a PBT, etc., being formed into shapes enveloping the upper holding plate 25 and the lower holding plate 27 so as to leave tip portions of the teeth 23a of the sensor core 23 exposed.

The upper holding plate 25 and the lower holding plate 27 are placed on the sensor core 23 from above and below, respectively. Here, as shown in FIGS. 6A, 6B, and 6C, upper and lower surfaces of the sensor core 23 are covered by the upper holding plate 25 and the lower holding plate 27, and the teeth 23a are covered by the electrically-insulating segments 25a and 27a except for the tip portions.

Next, an excitation coil 24a is prepared by winding a first conductor wire 30 onto all of the eight teeth 23a sequentially as shown in FIG. 8A. Here, the first conductor wire 30 is alternately wound into left-handed windings and right-handed windings on each of the teeth 23a. In FIG. 8A, each left-handed winding is indicated by an L and each right-handed winding by an R. Then, the winding start and the winding finish of the first conductor wire 30 are soldered to second ends 26b ($R_1$ and $R_2$) of the insert conductors 26 insert-molded into the upper holding plate 25.

A first output coil 24b is prepared by winding a second conductor wire 30 onto the first, third, fifth, and seventh teeth 23a sequentially as shown in FIG. 8B. Here, the second conductor wire 30 is alternately wound into right-handed windings and left-handed windings on each of the first, third, fifth, and seventh teeth 23a. Then, the winding start and the winding finish of the second conductor wire 30 are soldered to second ends 26b ($S_4$ and $S_2$) of the insert conductors 26 insert-molded into the upper holding plate 25.

A second output coil 24c is prepared by winding a third conductor wire 30 onto the eighth, fourth, sixth, and second teeth 23a sequentially as shown in FIG. 8C. Here, the third conductor wire 30 is alternately wound into right-handed windings and left-handed windings on each of the eighth, fourth, sixth, and second teeth 23a. Then, the winding start and the winding finish of the third conductor wire 30 are soldered to second ends 26b ($S_1$ and $S_3$) of the insert conductors 26 insert-molded into the upper holding plate 25.

The excitation coil 24a, the first output coil 24b, and the second output coil 24c prepared in this manner constitute the sensor coil 24. The conductor wires 30 are wound onto the electrically-insulating segments 25a and 27a covering the teeth 23a to obtain a sensor assembly in which the sensor core 23, the upper holding plate 25, and the lower holding plate 27 are integrated.

Next, the upper cover 28 and the lower cover 29 are fitted onto the sensor assembly from above and below, respectively, to obtain the sensor unit 22 shown in FIGS. 5A, 5B, and 5C. In this sensor unit 22, outer circumferential portions of the sensor core 23 are exposed between the upper cover 28 and the lower cover 29.

Insert conductors 32 are insert molded into the connector unit 31 using a resin such as a polybutylene terephthalate (PBT), etc., and as shown in FIGS. 10A and 10B, first ends 32a of the insert conductors 32 are exposed inside a first connector portion 31a to constitute input and output terminals and second ends 32b of the insert conductors 32 are exposed inside a second connector portion 31b to constitute input and output terminals. Flange portions 31c having connector-unit-mounting apertures 31d are formed integrally on the connector unit 31. A ring-shaped packing 33 is also mounted so as to surround the second connector portion 32b.

The flexible wiring 34 is constituted by a plurality of conducting wires coated with an electrical insulator and, as shown in FIG. 11, first and second connectors 35a and 35b are linked to first and second ends of the flexible wiring 34.

Next, a construction of the rear bracket 4 will be explained with reference to FIGS. 3 and 4.

The rear bracket 4 is formed into a general cup shape, a central aperture 4a into which the rear-end bearing 7 is fitted being disposed through the rear bracket 4 at a position of a central axis thereof.

A first seat 40 for mounting the sensor unit 22 is formed on an end surface of the rear bracket 4 on an outer circumferential side of the central aperture 4a so as to be perpendicular to the central axis. The first seat 40, as indicated by oblique lines in FIG. 4, forms a planar shape for contacting exposed rear surface outer circumferential edge portions of the sensor core 23. Sensor-unit-mounting threaded apertures 43a for mounting the sensor unit 22 are formed in the first seat 40 with the aperture centers thereof parallel to the central axis. Moreover, portions of the first seat 40 that the flange portions 23b of the sensor core 23 contact are formed such that the circumferential lengths thereof are larger than the circumferential lengths of the flange portions 23b.

A first peripheral wall 41 projects axially outward from the end surface of the rear bracket 4 and extends circumferentially, constituting a housing space for the sensor unit 22 and the connector unit 31. A notch 41a for the connector unit to project through is formed by cutting away a portion of the first peripheral wall 41. End-plate-mounting threaded apertures 43b for mounting the end plate 13 are formed in the first peripheral wall 41 with the aperture centers thereof parallel to the central axis. Another portion of the first peripheral wall 41, as indicated by vertical lines in FIG. 4, is formed along an outer circumferential portion of the first seat 40 for approximately half of the circumference of the first seat 40 to constitute a sensor-unit-positioning peripheral wall 41b whose inner circumferential surface 41c contacts an outer circumferential surface of the sensor core 23 and regulates radial movement of the sensor unit 22.

In addition, second peripheral walls 44 are formed so as to face the sensor-unit-positioning peripheral wall 41b along outer circumferential portions of the first seat 40, inner circumferential surfaces 44a of the second peripheral walls 44 contacting outer circumferential surfaces of the sensor core 23 and regulating radial movement of the sensor unit 22.

A second seat 42 for mounting the connector unit 31 is formed on an end surface of the rear bracket 4 on an outer circumferential side of the notch 41a so as to be perpendicular to the central axis. Connector-unit-mounting threaded apertures 43c for mounting the connector unit 31 are formed in the second seat 42 with the aperture centers thereof parallel to the central axis.

Moreover, the heights of the first seat 40, the second seat 42, end surfaces of the first peripheral wall 41, and end surfaces of the second peripheral walls 44 from the inner wall surface of the rear bracket 4 in ascending order are: the second seat 42; the first seat 40; the end surfaces of the second peripheral walls 44; and the end surfaces of the first peripheral wall 41.

A method for mounting the rotation detecting apparatus 12 will now be explained.

First, the sensor rotor 21 is adjusted to a predetermined angular position relative to the rotor 8 and fixed by press-fitting the interfitting aperture 21a thereof onto a rear-end end portion of the shaft 5.

Then, the sensor unit 22 and the connector unit 31 are electrically connected to each other by means of the flexible wiring 34 by fitting the first connector 35a into the connector portion 25b of the sensor unit 22 and fitting the second connector 35b into the second connector portion 31b of the connector unit 31.

Next, the sensor unit 22 is housed inside the first peripheral wall 41 using the sensor-unit-positioning peripheral wall 41b and the second peripheral walls 44 as guides, and is temporarily fastened to the rear bracket 4 by passing core-mounting screws (not shown) through the core-mounting apertures 23c and engaging them in the sensor-unit-mounting threaded apertures 43a. Thus, the rear surface outer circumferential edge portions of the sensor core 23 come into contact with the first seat 40, positioning the sensor unit 22 in an axial direction. Then, outer circumferential surfaces of the sensor core 23 contact the inner circumferential surfaces 41c and 44a of the sensor-unit-positioning peripheral wall 41b and the second peripheral walls 44, positioning the sensor unit 22 in a radial direction. Here, because portions of the first seat 40 that the flange portions 23b contact are formed such that the circumferential lengths thereof are larger than the circumferential lengths of the flange portions 23b, the sensor unit 22 is pivotable about the central axis. Thus, the sensor unit 22 is mounted to the rear bracket 4 by pivoting the sensor unit 22 about the central axis to position the sensor unit 22 relative to a circumferential direction then fastening the core-mounting screws.

Next, the connector unit 31 is disposed such that the first connector portion 31a thereof projects through the notch 41a. Here, the packing 33 mounted to the second connector portion 31b is press-fitted into the notch 41a. Then, the connector unit 31 is mounted to the rear bracket 4 by passing connector-unit-mounting screws (not shown) through the connector-unit-mounting apertures 31d and fastening them into the connector-unit-mounting threaded apertures 43c. The end plate 13 is then mounted to the rear bracket 4 by placing the end plate 13 on the first peripheral wall 41 and fastening end-plate-mounting screws 45 into the end-plate-mounting threaded apertures 43b. Thus, the packing 33 is pressed and held between the end plate 13 and the notch 41a.

Operation of the automotive generator-motor 1 constructed in this manner when used as an electric motor will now be explained.

During starting of an engine, an alternating current is supplied sequentially to each phase of the three-phase stator coil 18 by a three-phase drive circuit (not shown), and a direct current is supplied to the rotor coil 16 by means of the brushes 19 and the slip rings 10. Thus, the stator coil 18 and the rotor coil 16 become electromagnets, and the rotor 8 rotates inside the stator 9 together with the shaft 5. Torque from the shaft 5 is transmitted to an output shaft of the engine by means of the pulley 14, starting the engine.

At this time, the sensor rotor 21 rotates together with the rotation of the shaft 5. Thus, the gap permeance between the sensor rotor 21 and the sensor core 23 changes sinusoidally with angle. When an excitation voltage $E_{R1 \cdot R2}$ (=E sin ω t) is applied to the first and second ends ($R_1$ and $R_2$) of the excitation coil 24a of the sensor coil 24 from an external portion by means of the connector unit 31 and the flexible wiring 34, a first output voltage $E_{S1 \cdot S3}$ (=K E sin ω t cos (X θ)) is output at the first and second ends ($S_1$ and $S_3$) of the first output coil 24b, and a second output voltage $E_{S2 \cdot S4}$ (=K E sin ω t sin (X θ)) is output at the first and second ends ($S_2$ and $S_4$) of the second output coil 24c. Moreover, K is a ratio of transformation, θ is a rotation angle, E is an input voltage, ω=2πf, f is an excitation frequency, t is time (in seconds), and X is an axial double angle (in this case, 2).

These two phases of output voltage $E_{S1 \cdot S3}$ and $E_{S2 \cdot S4}$ are output to an external control apparatus (not shown) by means of the flexible wiring 34 and the connector unit 31 and converted to a rotation angle. Then, the control apparatus controls the alternating current supplied sequentially to each of the phases of the three-phase stator coil 18 such that the direction of rotation of the rotor 8 is constant and a predetermined rotational frequency is achieved.

Next, operation of the automotive generator-motor 1 when used as a generator will be explained.

When an engine is started, torque from the engine is transmitted to the shaft 5 by means of the pulley 14, rotating the shaft 5. Thus, when a direct current is supplied to the rotor coil 16 by means of the brushes 19 and the slip rings 10, the rotor coil 16 is excited and becomes an electromagnet. By rotating the rotor 8 inside the stator 9 in this state, an alternating current is induced sequentially in the stator coil 18 installed in the stator core 17 and a generated voltage rises rapidly. This three-phase alternating current is input into a three-phase rectifying circuit (not shown) and rectified into a direct current. The direct-current voltage rectified by the three-phase rectifying circuit charges a battery and is supplied to an electric load.

According to Embodiment 1, because the brushes 19 and the slip rings 10 are disposed axially inside the rear-end bearing 7 and the rotation detecting apparatus 12 is disposed axially outside the rear-end bearing 7, the rotation detecting apparatus 12 is isolated from the sliding portion between the brushes 19 and the slip rings 10 by means of the rear bracket 4 and the rear-end bearing 7. Thus, abraded brush dust generated in the sliding portion between the brushes 19 and the slip rings 10 does not penetrate into the rotation detecting apparatus 12, enabling rotation detection by the rotation detecting apparatus 12 to be performed stably.

Because the rotation detecting apparatus 12 is constructed so as to be divided into the sensor unit 22 and the connector unit 31 and the sensor unit 22 and the connector unit 31 are electrically connected to each other by means of the flexible wiring 34, external forces when an external connector is inserted into or removed from the connector unit 31 do not act on the sensor unit 22 precisely positioned on and mounted to the rear bracket 4. Thus, the mounted position of the precisely positioned sensor unit 22 is ensured, maintaining rotation detection precision with high precision.

First and second connectors 35a and 35b are mounted to the first and second ends of the flexible wiring 34, a holding plate connector portion 25b is formed on the sensor unit 22, and a second connector portion 32b is formed on the connector unit 31. Because an electrical connection between the sensor unit 22 and the connector unit 31 is adopted in which the first connector 35a is fitted into the holding plate connector portion 25b and the second connector 35b is fitted into the second connector portion 32b, the need for a soldering operation between the input and output terminals and the flexible wiring 34 is eliminated, improving assembly.

Because the sensor unit 22 and the connector unit 31 are securely fastened to the rear bracket 4 from axially outside by means of the core-mounting and connector-unit-mounting screws, the fastening direction of each of these mounting screws is the same, facilitating assembly.

Because a first seat 40 for receiving rear surface outer circumferential edge portions of the sensor core 23 of the sensor unit 22 is formed on the rear bracket 4 so as to be perpendicular to the central axis and a peripheral wall 41b for contacting outer circumferential surfaces of the sensor core 23 is formed on an outer circumferential portion of the first seat 40, when the sensor unit 22 is being mounted to the rear bracket 4, axial positioning of the sensor unit 22 is achieved by placing the rear surface outer circumferential edge portions of the sensor core 23 in contact with the first seat 40 and radial positioning of the sensor unit 22 is achieved by placing the outer circumferential surfaces of the sensor core 23 in contact with the inner circumferential surfaces 41c of the peripheral wall 41b. Consequently, the operation of mounting the sensor unit 22 is facilitated, and positioning of the sensor unit 22 is performed simply.

Because the circumferential length of the portions of the first seat 40 that the flange portions 23b contact is made larger than the circumferential length of the flange portions 23b, the sensor unit 22 received by the first seat 40 is pivotable about the central axis. Thus, fine adjustment of the circumferential position of the sensor unit 22, in other words, of the angle of the sensor unit 22 on a plane perpendicular to the central axis, is facilitated.

Because elongated core-mounting apertures 23c are disposed on the flange portions 23b, fine angular adjustment is made possible with the sensor unit 22 temporarily fastened to the rear bracket 4, facilitating the angular adjustment operation.

Because the sensor unit 22 includes an annular sensor core 23 in which teeth 23a are formed at a uniform angular pitch in a circumferential direction and a sensor coil 24 installed in the teeth 23a, and is disposed so as to surround the sensor rotor 21, and the sensor rotor 21 is formed with an external shape such that the gap permeance between the sensor rotor 21 and the sensor core 23 changes sinusoidally with angle, a compact rotation detecting apparatus is obtained enabling the rotational angle of the rotor 8 to be detected with high precision by a simple construction.

Because the mounting flange portions 23b are formed integrally with the sensor core 23, the sensor unit 22 can be mounted directly to the rear bracket 4 using the flange portions 23b. Consequently, because members such as securing plates, etc., are no longer necessary and the number of parts is reduced, cost reductions are enabled and assembly is improved.

Because a peripheral wall 41 having a notch 41a for the connector unit to project through is formed on an end surface of the rear bracket 4 so as to surround the sensor unit 22 and the connector unit 31, an end plate 13 is securely fastened to the peripheral wall 41 and covers an axial opening of the peripheral wall 41, and a ring-shaped packing 33 is mounted to the connector unit 31 so as to be pressed by the notch 41a and the end plate 13, waterproofing and dustproofing of the rotation detecting apparatus 12 can be achieved without applying external force to the sensor unit 22.

Furthermore, in the conventional device shown in FIG. 17, because the brush apparatus 110 and the rotor position detecting apparatus 111 are disposed axially outside the rear-end bracket 103, a large rear cover 112 has been required in order to isolate the brush apparatus 110 and the rotor position detecting apparatus 111 from the exterior, making mounting and sealing poor. However, in Embodiment 1, because the brushes 19 and the slip rings 10 are disposed inside the housing 2 and the rotation detecting apparatus 12 is disposed on an end portion of the shaft 5 projecting beyond the housing 2, only the rotation detecting apparatus 12 needs to be isolated from the exterior, enabling reductions in the size of the end plate 13, thereby enabling the mounting and sealing thereof to be improved.

Embodiment 2

In Embodiment 2, conductor wires of the flexible wiring 34 are welded to input and output terminals of the sensor unit 22 and the connector unit 31.

Moreover, the rest of this embodiment is constructed in a similar manner to Embodiment 1 above.

Consequently, according to Embodiment 2, the first and second connectors 35a and 35b in Embodiment 1 above are no longer necessary, enabling the number of parts to be reduced. In addition, because the conductor wires of the flexible wiring 34 and input and output terminals of the sensor unit 22 and the connector unit 31 are welded, electrical connection between the sensor unit 22 and the connector unit 31 is strengthened, increasing the reliability of rotation detection.

Embodiment 3

Figure 12:
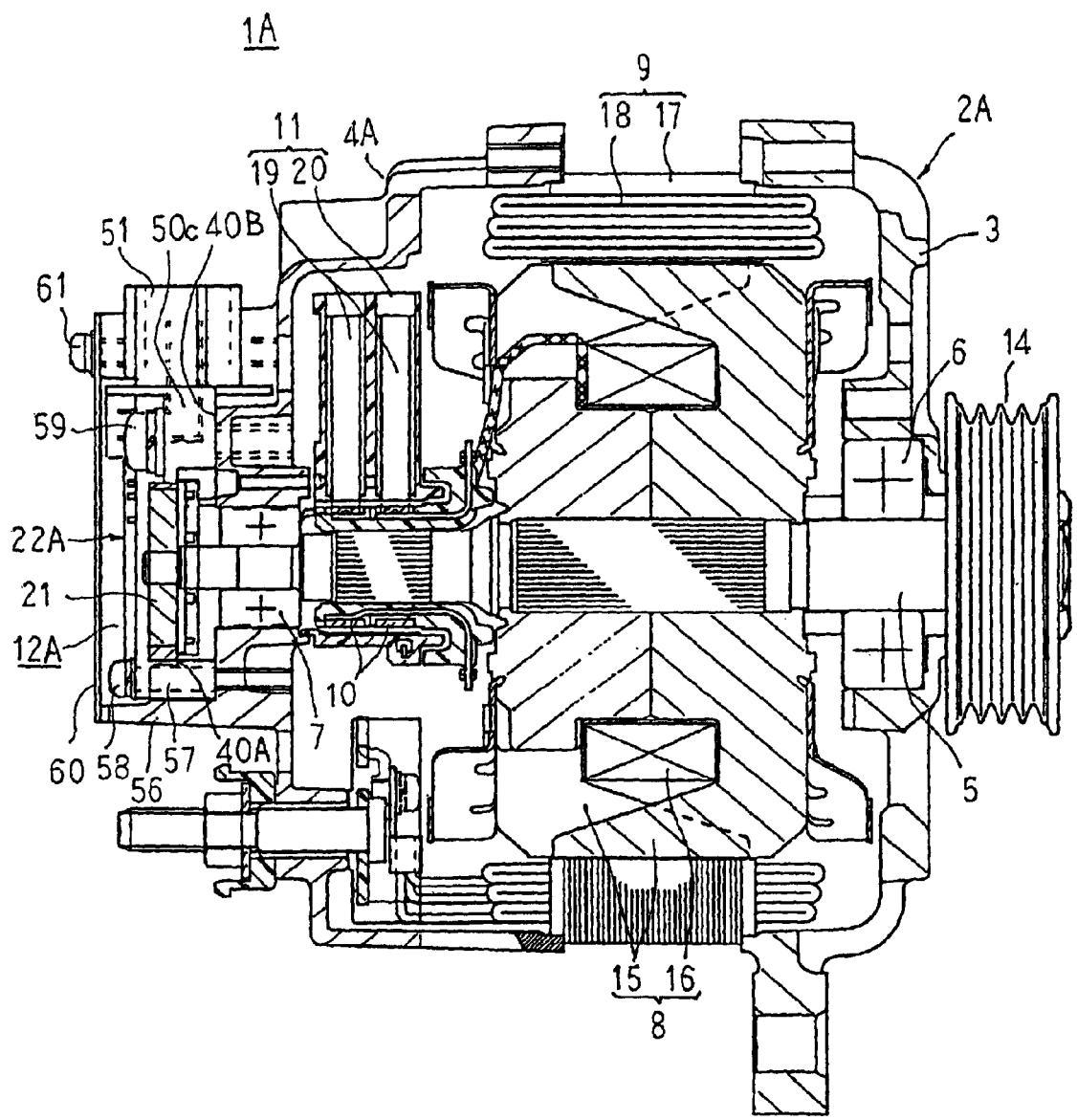
FIG. 12 is a longitudinal section showing an automotive generator-motor according to Embodiment 3 of the present invention.
Figure 13:
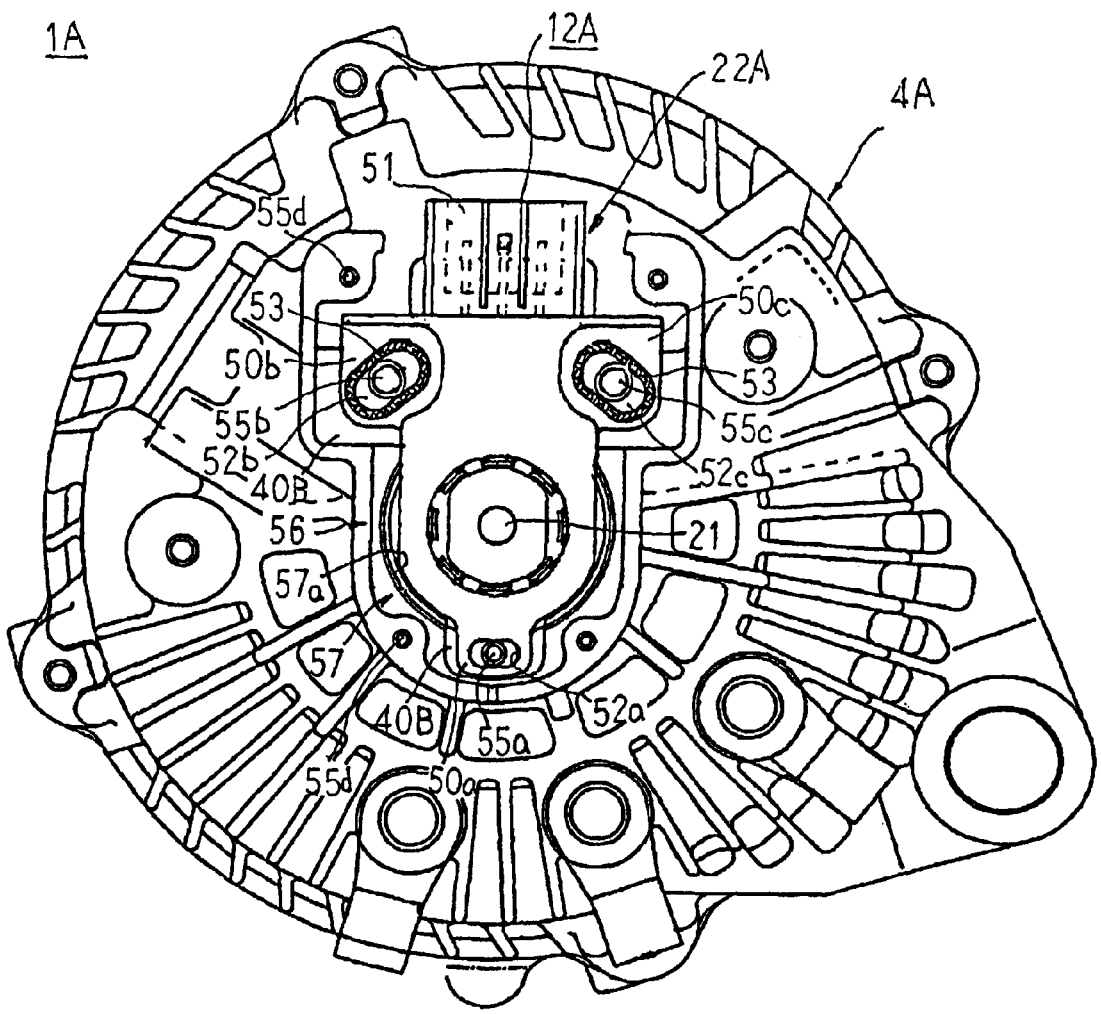
FIG. 13 is an end elevation showing the automotive generator-motor according to Embodiment 3 of the present invention from a rear end before an end plate is mounted.
Figure 14:
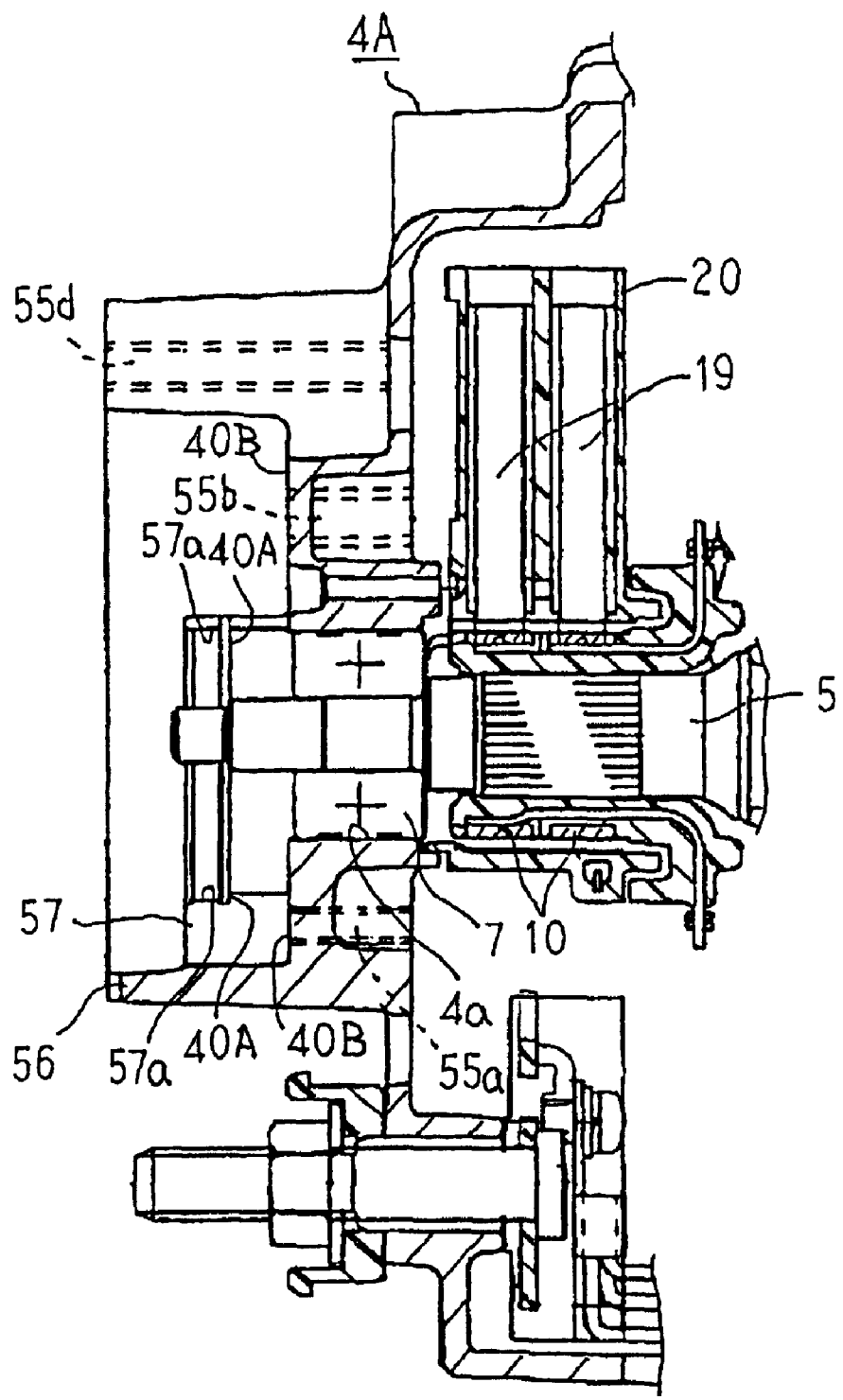
FIG. 14 is a partial cross section showing a vicinity of a rear-end bearing of the automotive generator-motor according to Embodiment 3 of the present invention before a rotation detecting apparatus is mounted.
Figure 15:
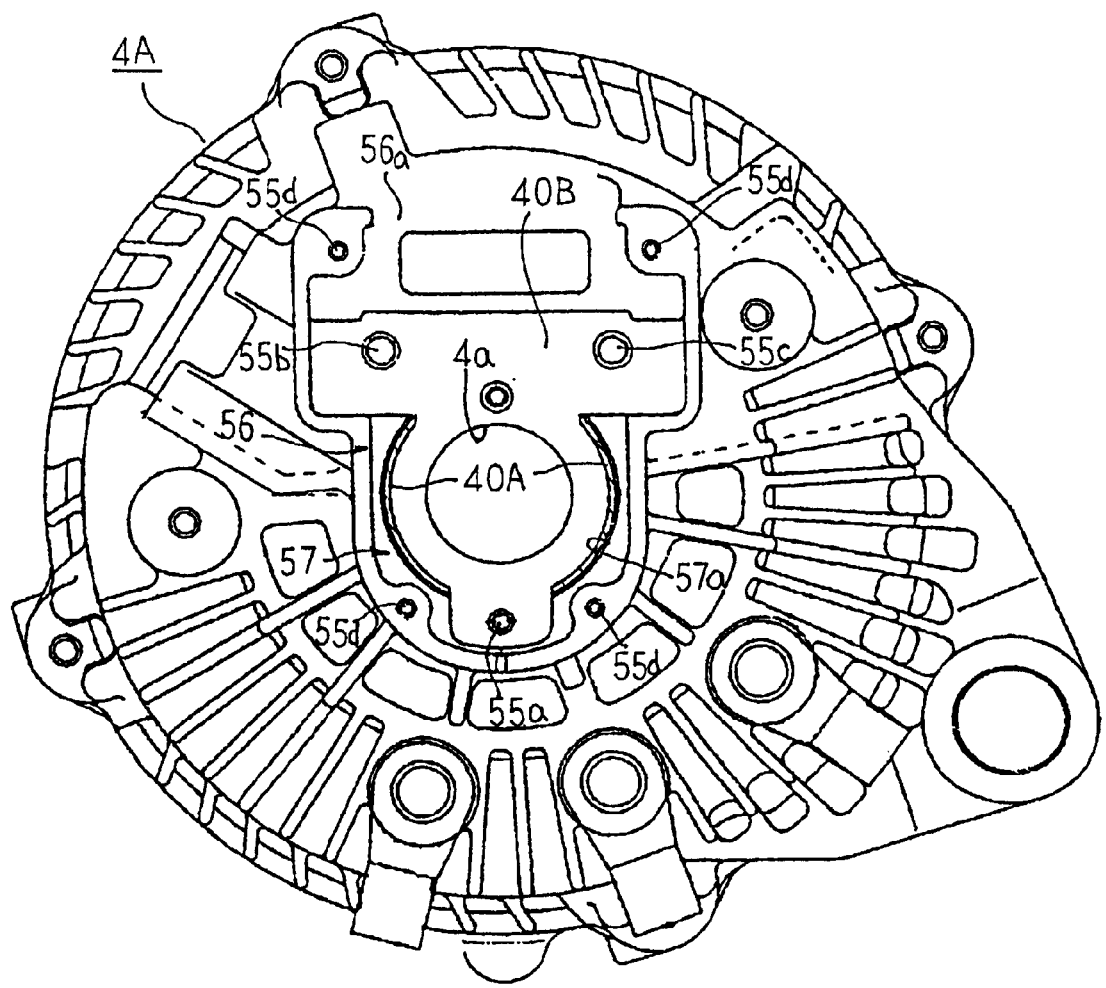
FIG. 15 is an end elevation showing the automotive generator-motor according to Embodiment 3 of the present invention from a rear end before a rotation detecting apparatus is mounted.
Figure 16A:
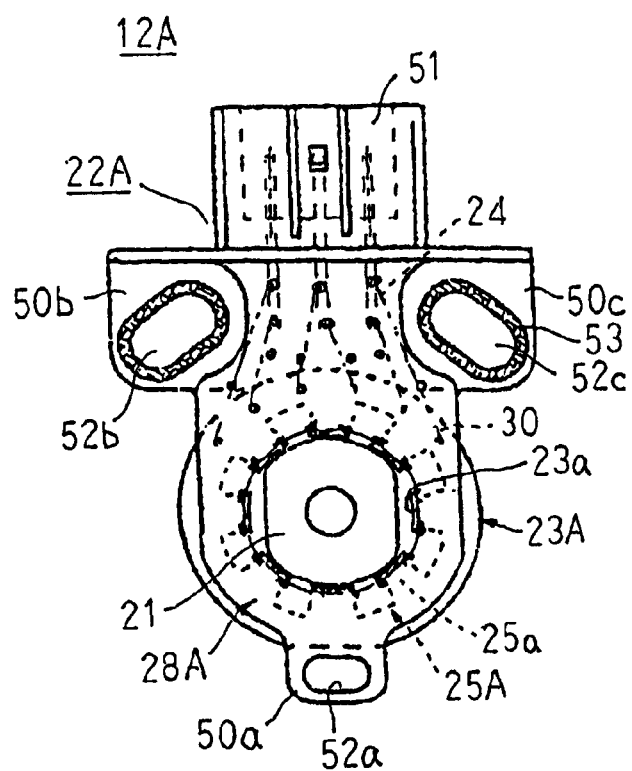
FIG. 16A is a front elevation explaining a construction of the rotation detecting apparatus mounted to the automotive generator-motor according to Embodiment 3 of the present invention.
Figure 16B:
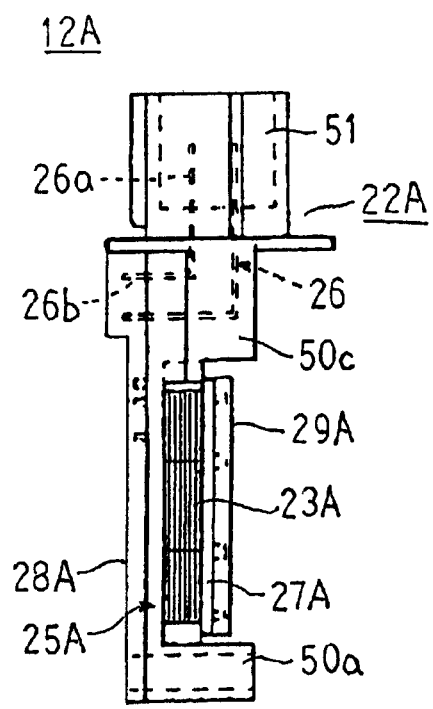
FIG. 16B is a side elevation explaining the construction of the rotation detecting apparatus mounted to the automotive generator-motor according to Embodiment 3 of the present invention.

FIG. 12 is a longitudinal section showing an automotive generator-motor according to Embodiment 3 of the present invention, FIG. 13 is an end elevation showing the automotive generator-motor according to Embodiment 3 of the present invention from a rear end before an end plate is mounted, FIG. 14 is a partial cross section showing a vicinity of a rear-end bearing of the automotive generator-motor according to Embodiment 3 of the present invention before a rotation detecting apparatus is mounted, and FIG. 15 is an end elevation showing the automotive generator-motor according to Embodiment 3 of the present invention from a rear end before a rotation detecting apparatus is mounted. FIGS. 16A and 16B are a front elevation and a side elevation, respectively, explaining a construction of the rotation detecting apparatus mounted to the automotive generator-motor according to Embodiment 3 of the present invention. Moreover, in each of the figures, portions the same as or corresponding to those in the automotive generator-motor 1 according to Embodiment 1 above will be given the same numbering, and explanation thereof will be omitted.

The automotive generator-motor 1A according to Embodiment 3, as shown in FIGS. 12 and 13, is constructed in a similar manner to the automotive generator-motor 1 according to Embodiment 1 above except for the fact that a rotation detecting apparatus 12A in which a sensor unit and a connector unit are constructed integrally is used instead of the rotation detecting apparatus 12.

A construction of the rotation detecting apparatus 12A will now be explained with reference to FIGS. 16A and 16B.

The rotation detecting apparatus 12 is constituted by a sensor rotor 21, a sensor core 23A, a sensor coil 24, an upper holding plate 25A, a lower holding plate 27A, an upper cover 28A, a lower cover 29A, etc.

The sensor core 23A is constructed by laminating and integrating a predetermined number of sheets of a magnetic material such as a carbon steel sheet, for example, formed by punching into a predetermined shape. The sensor core 23A is formed into an annular shape, eight (first to eighth) teeth 23a projecting radially inward being formed at a uniform angular pitch in a circumferential direction.

Insert conductors 26 are insert molded into the upper holding plate 25A using a resin such as a PBT, etc., electrically-insulating segments 25a having a square bracket-shaped cross section for covering upper surfaces and first and second side surfaces of the teeth 23a of the sensor core 23A being formed integrally on the upper holding plate 25, and first, second, and third flange portions 50a, 50b, and 50c and a connector portion 51 also being formed integrally thereon. First ends 26a of the insert conductors 26 project inside a connector portion 51 to constitute input and output terminals, and second ends 26b project from an upper surface of the upper holding plate 25A. Bottom surfaces of the flange portions 50a, 50b, and 50c are formed so as to be positioned in a common plane, and elongated first, second, and third mounting apertures 52a, 52b, and 52c are disposed through each. Metal bushes 53 are press-fitted into the second and third mounting apertures 52b and 52c.

The lower holding plate 27A is injection molded using a resin such as a PBT, etc., electrically-insulating segments (not shown) having a square bracket-shaped cross section for covering lower surfaces and first and second side surfaces of the teeth 23a of the sensor core 23A being formed integrally therewith.

The upper cover 28A and the lower cover 29A are injection molded using a resin such as a PBT, etc., being formed into shapes enveloping the upper holding plate 25A and the lower holding plate 27A so as to leave tip portions of the teeth 23a of the sensor core 23A exposed.

The upper holding plate 25A and the lower holding plate 27A are placed on the sensor core 23A from above and below, respectively. Here, upper and lower surfaces of the sensor core 23A are covered by the upper holding plate 25A and the lower holding plate 27A, and the teeth 23a are covered by the electrically-insulating segments except for the tip portions.

Next, a sensor coil 24 composed of an excitation coil, a first output coil, and a second output coil is obtained by winding three conductor wires 30 onto the eight teeth 23a sequentially as shown in FIGS. 8A, 8B, and 8C. Here, the conductor wires 30 are wound onto the electrically-insulating segments covering the teeth 23a to obtain a sensor assembly in which the sensor core 23A, the upper holding plate 25A, and the lower holding plate 27A are integrated.

Next, the upper cover 28A and the lower cover 29A are fitted onto the sensor assembly from above and below, respectively, to obtain a sensor unit 22A. In this sensor unit 22A, outer circumferential portions of the sensor core 23A are exposed between the upper cover 28A and the lower cover 29A. The connector portion 51 is formed integrally with the sensor unit 22A.

Next, a construction of a rear bracket 4A will be explained with reference to FIGS. 14 and 15.

The rear bracket 4A is formed into a general cup shape, a central aperture 4a into which the rear-end bearing 7 is fitted being disposed through the rear bracket 4 at a position of a central axis thereof.

A first seat 40A for mounting the sensor unit 22A is formed on an end surface of the rear bracket 4A on an outer circumferential side of the central aperture 4a so as to be perpendicular to the central axis. The first seat 40A, as indicated by horizontal lines in FIG. 15, forms an arc-shaped planar shape for contacting exposed rear surface outer circumferential edge portions of the sensor core 23A. A second seat 40B for mounting the sensor unit 22A is formed on an end surface of the rear bracket 4A on an outer circumferential side of the central aperture 4a so as to be perpendicular to the central axis. This second seat 40B forms a planar shape for contacting the bottom surfaces of the flange portions 50a, 50b, and 50c of the sensor unit 22A.

Sensor-unit-mounting threaded apertures 55a, 55b, and 55c for mounting the sensor unit 22A are formed in the second seat 40B with the aperture centers thereof parallel to the central axis. Moreover, portions of the second seat 40B contacting the flange portions 50a, 50b, and 50c are formed such that the circumferential lengths thereof are larger than the circumferential lengths of the flange portions 50a, 50b, and 50c.

A first peripheral wall 56 projects axially outward from the end surface of the rear bracket 4A and extends circumferentially so as to surround the first and second seats 40A and 40B, constituting a housing space for the sensor unit 22A. A notch 56a for the connector portion 51 to project through is formed by cutting away a portion of the first peripheral wall 56. End-plate-mounting threaded apertures 55d for mounting an end plate 60 are formed in the first peripheral wall 56 with the aperture centers thereof parallel to the central axis. Second peripheral walls 57 are formed along outer circumferential portions of the first seat 40A and outer circumferential portions of the portions of the second seat 40B that the first flange portion 50a contacts, inner circumferential surfaces 57a of the second peripheral walls 57 contacting outer circumferential surfaces of the sensor core 23A and constituting sensor-unit-positioning peripheral walls for regulating radial movement of the sensor unit 22A.

Moreover, the heights of the first seat 40A, the second seat 40B, end surfaces of the first peripheral wall 56, and end surfaces of the second peripheral walls 57 from the inner wall surface of the rear bracket 4A in ascending order are: the second seat 40B; the first seat 40A; the end surfaces of the second peripheral walls 57; and the end surfaces of the first peripheral wall 56.

A method for mounting the rotation detecting apparatus 12A will now be explained.

First, the sensor rotor 21 is adjusted to a predetermined angular position relative to the rotor 8 and fixed by press-fitting the interfitting aperture 21a thereof onto a rear-end end portion of to the shaft 5.

Then, the sensor unit 22A is housed inside the first peripheral wall 56 using the second peripheral walls 57 functioning as a sensor-unit-positioning peripheral wall as guides, and is temporarily fastened to the rear bracket 4A by passing sensor-unit-mounting screws 58 and 59 through the mounting apertures 52a, 52b, and 52c and engaging them in the sensor-unit-mounting threaded apertures 55a, 55b, and 55c. Thus, the rear surface outer circumferential edge portions of the sensor core 23A come into contact with the first seat 40A, positioning the sensor unit 22A in an axial direction. Then, outer circumferential surfaces of the sensor core 23A contact the inner circumferential surfaces 57a of the second peripheral walls 57, positioning the sensor unit 22A in a radial direction. Here, because portions of the second seat 40B that the flange portions 50a, 50b, and 50c contact are formed such that the circumferential lengths thereof are larger than the circumferential lengths of the flange portions 50a, 50b, and 50c, the sensor unit 22A is pivotable about the central axis. Thus, the sensor unit 22A is mounted to the rear bracket 4A by pivoting the sensor unit 22A about the central axis to position the sensor unit 22A relative to a circumferential direction, then fastening the sensor-unit-mounting screws 58 and 59.

The end plate 60 is then mounted to the rear bracket 4A by placing the end plate 60 on the first peripheral wall 57 and fastening end-plate-mounting screws 61 into the end-plate-mounting threaded apertures 55d. A tip portion of the connector portion 51 formed integrally with the sensor unit 22A projects through the notch 56a.

The automotive generator-motor 1A constructed in this manner operates in a similar manner to the automotive generator-motor 1 above.

According to Embodiment 3, because the brushes 19 and the slip rings 10 are disposed axially inside the rear-end bearing 7 and the rotation detecting apparatus 12A is disposed axially outside the rear-end bearing 7, the rotation detecting apparatus 12A is isolated from the sliding portion between the brushes 19 and the slip rings 10 by means of the rear bracket 4A and the rear-end bearing 7. Thus, abraded brush dust generated in the sliding portion between the brushes 19 and the slip rings 10 does not penetrate into the rotation detecting apparatus 12A, enabling rotation detection by the rotation detecting apparatus 12A to be performed stably.

Because the connector portion 51 is formed integrally with the sensor unit 22A, the number of parts is reduced, improving assembly.

Because the sensor unit 22A and the end plate 60 are securely fastened to the rear bracket 4A from axially outside by means of the sensor-unit- and end-plate-mounting screws 58, 59, and 61, the fastening direction of each of the mounting screws 58, 59, and 61 is the same, facilitating assembly.

Because a first seat 40A for receiving rear surface outer circumferential edge portions of the sensor core 23A of the sensor unit 22A and a second seat 40B for receiving the bottom surfaces of the flange portions 50a, 50b, and 50c are formed on the rear bracket 4A so as to be perpendicular to the central axis and second peripheral walls 57 having inner circumferential surfaces 57a for contacting outer circumferential surfaces of the sensor core 23A are formed on an outer circumferential portion of the first seat 40A, when the sensor unit 22A is being mounted to the rear bracket 4A, axial positioning of the sensor unit 22A is achieved by placing the rear surface outer circumferential edge portions of the sensor core 23A in contact with the first seat 40A and placing the bottom surfaces of the flange portions 50a, 50b, and 50c in contact with the second seat 40B. In addition, radial positioning of the sensor unit 22A is achieved by placing the outer circumferential surfaces of the sensor core 23A in contact with the inner circumferential surfaces 57a of the second peripheral walls 57. Consequently, the operation of mounting the sensor unit 22A is facilitated, and positioning of the sensor unit 22A is performed simply.

Because the circumferential length of the portions of the second seat 40B that the flange portions 50a, 50b, and 50c contact is made larger than the circumferential length of the flange portions 50a, 50b, and 50c, the sensor unit 22A received by the first seat 40A and the second seat 40B is pivotable about the central axis. Thus, fine adjustment of the circumferential position of the sensor unit 22A, in other words, of the angle of the sensor unit 22A on a plane perpendicular to the central axis, is facilitated.

Because elongated mounting apertures 52a, 52b, and 52c are disposed on the flange portions 50a, 50b, and 50c, fine angular adjustment is made possible with the sensor unit 22A temporarily fastened to the rear bracket 4A, facilitating the angular adjustment operation.

Because the sensor unit 22A includes an annular sensor core 23A in which teeth 23a are formed at a uniform angular pitch in a circumferential direction and a sensor coil 24 installed in the teeth 23a, and is disposed so as to surround the sensor rotor 21, and the sensor rotor 21 is formed with an external shape such that the gap permeance between the sensor rotor 21 and the sensor core 23A changes sinusoidally with angle, a rotation detecting apparatus is obtained enabling the rotational angle of the rotor 8 to be detected with high precision by a simple construction.

Because the mounting flange portions 50a, 50b, and 50c are formed integrally with the sensor unit 22A, the sensor unit 22A can be mounted directly to the rear bracket 4A using the flange portions 50a, 50b, and 50c. Consequently, because members such as securing plates, etc., are no longer necessary and the number of parts is reduced, cost reductions are enabled, and assembly is improved.

In Embodiment 3 also, because the brushes 19 and the slip rings 10 are disposed inside the housing 2A and the rotation detecting apparatus 12A is disposed on an end portion of the shaft 5 projecting beyond the housing 2A, only the rotation detecting apparatus 12A needs to be isolated from the exterior, enabling reductions in the size of the end plate 60, thereby enabling the mounting and sealing thereof to be improved.

Here in Embodiment 3, a ring-shaped packing may also be mounted to the connector portion 51 in a similar manner to Embodiment 1 above, the packing being pressed by the notch 56a and the end plate 60. Thus, waterproofing and dustproofing of the rotation detecting apparatus 12A are achieved.

Furthermore, in Embodiment 3, the mounting flange portions are formed integrally with the upper holding plate 25A, but the mounting flange portions may also be formed integrally with the sensor core 23A.

Moreover, each of the above embodiments has been explained for a case in which the rotation detecting apparatus used is provided with a sensor unit having an annular sensor core and an excitation coil and first and second output coils installed in teeth; and a sensor rotor, but the rotation detecting apparatus is not limited to this construction, and similar effects can also be achieved using the position sensor 123 from the conventional dynamoelectric machine as a sensor unit and the magnetic pole holding plate 121 to which magnetic sensor poles 122 are fixed as a sensor rotor.

In each of the above embodiments, the sensor rotor is mounted to the rear-end end portion of the shaft by press-fitting, but the sensor rotor may also be mounted to a rear-end end surface of the shaft so as to be securely fastened using a mounting screw.

In each of the above embodiments, a pair of slip rings 10 are explained as being used for the contacted part with which the pair of brushes 19 come into contact, but a commutator may also be used for the contacted part.

In each of the above embodiments, the present invention has been explained as it applies to a generator-motor, but the present invention may also be applied to an electric motor performing only driving.

The present invention is constructed in the above manner and exhibits the effects described below.

In order to achieve the above object, according to one aspect of the present invention, there is provided a dynamoelectric machine including:

a housing;

a first bearing disposed in a first axial end portion of the housing;

a second bearing disposed in a second axial end portion of the housing;

a shaft rotatably supported in the housing by means of the first and second bearings;

a rotor having a rotor core and a rotor coil installed in the rotor core, the rotor core being fixed to the shaft and rotatably disposed inside the housing;

a stator having a stator core and a stator coil installed in the stator core, the stator core being supported in the housing so as to surround an outer circumference of the rotor;

a contacted part fixed to an outer circumference of the shaft axially inside the first bearing and electrically connected to the rotor coil;

a contact disposed so as to contact an outer circumferential surface of the contacted part; and a rotation detecting apparatus having:
   a sensor rotor fixed to an end portion of the shaft projecting axially outside the first bearing;
   a sensor unit disposed in close proximity to the sensor rotor; and
   a connector unit for delivering input and output signals to and from the sensor unit, thereby providing a dynamoelectric machine enabling an angular position of the rotor to be detected with high precision by preventing abrasion dust arising due to sliding motion between the contact and the contacted part from penetrating into the rotation detecting apparatus.

The sensor unit and the connector unit may be formed integrally, being fixed to an end surface at a first end of the housing, reducing the number of parts.

The sensor unit and the connector unit may be formed separately, each being fixed to an end surface at a first end of the housing, the sensor unit and the connector unit being electrically connected by means of flexible wiring, preventing external forces when the connector unit is connected to an external cable from acting on the sensor unit after it has been positioned and fixed, enabling the angular position of the rotor to be detected with high precision.

A connection between the flexible wiring and the sensor unit and/or between the flexible wiring and the connector unit may be made using a connector, improving assembly.

A connection between the flexible wiring and the sensor unit and/or between the flexible wiring and the connector unit may be welded, improving the reliability of electrical connection between the sensor unit and the connector unit.

The sensor unit and the connector unit may be securely fastened to the housing from axially outside by means of a mounting screw, improving assembly.

A seat for mounting the sensor unit may be formed on the end surface at the first end of the housing, a peripheral wall for positioning the sensor unit being disposed so as to stand at an outer circumferential portion of the seat, facilitating positioning of the sensor unit.

A peripheral wall having a notch for projection of a connector may be formed on an end surface at the first end of the housing so as to surround the sensor unit and the connector unit, an end plate being securely fastened to the peripheral wall so as to cover an axial opening of the peripheral wall, and a ring-shaped packing being mounted to the connector unit so as to be pressed by the notch and the end plate, enabling a waterproof and dustproof construction of the rotation detecting apparatus to be configured simply.

The sensor unit may have an annular sensor core in which teeth are formed at a uniform angular pitch in a circumferential direction and a sensor coil installed in the teeth, the sensor unit being disposed so as to surround the sensor rotor, the sensor rotor being formed with an external shape such that a gap permeance between the sensor rotor and the sensor core changes sinusoidally with angle, thereby providing a rotation detecting apparatus enabling the rotational angle of the rotor to be detected with high precision by a simple and compact construction.

A mounting flange portion may be formed integrally on the sensor core, eliminating the need to fix the sensor unit using a separate member, thereby reducing the number of parts.

What is claimed is:

1. A dynamoelectric machine comprising:

a housing;

a first bearing disposed in a first axial end portion of said housing;

a second bearing disposed in a second axial end portion of said housing;

a shaft rotatably supported in said housing by means of said first and second bearings;

a rotor having a rotor core and a rotor coil installed in said rotor core, said rotor core being fixed to said shaft and rotatably disposed inside said housing;

a stator having a stator core and a stator coil installed in said stator core, said stator core being supported in said housing so as to surround an outer circumference of said rotor;

a contacted part fixed to an outer circumference of said shaft axially inside said first bearing and electrically connected to said rotor coil;

a contact disposed so as to contact an outer circumferential surface of said contacted part; and a rotation detecting apparatus comprising:

a sensor rotor fixed to an end portion of said shaft projecting axially outside said first bearing;

a sensor unit disposed in close proximity to said sensor rotor; and a connector unit for delivering input and output signals to and from said sensor unit.

2. The dynamoelectric machine according to claim 1, wherein:

said sensor unit and said connector unit are formed integrally, being fixed to an end surface at a first end of said housing.

3. The dynamoelectric machine according to claim 2, wherein:

a seat for mounting said sensor unit is formed on said end surface at said first end of said housing, a peripheral wall for positioning said sensor unit being disposed so as to stand at an outer circumferential portion of said seat.

4. The dynamoelectric machine according to claim 2, wherein:

a peripheral wall having a notch for projection of a connector is formed on an end surface at said first end of said housing so as to surround said sensor unit and said connector unit, an end plate being securely fastened to said peripheral wall so as to cover an axial opening of said peripheral wall, and a ring-shaped packing being mounted to said connector unit so as to be pressed by said notch and said end plate.

5. The dynamoelectric machine according to claim 1, wherein:

said sensor unit and said connector unit are formed separately, each being fixed to an end surface at a first end of said housing, said sensor unit and said connector unit being electrically connected by means of flexible wiring.

6. The dynamoelectric machine according to claim 5, wherein:

a connection between said flexible wiring and said sensor unit and/or between said flexible wiring and said connector unit is made using a connector.

7. The dynamoelectric machine according to claim 5, wherein:

a connection between said flexible wiring and said sensor unit and/or between said flexible wiring and said connector unit is welded.

8. The dynamoelectric machine according to claim 5, wherein:

said sensor unit and said connector unit are securely fastened to said housing from axially outside by means of a mounting screw.

9. The dynamoelectric machine according to claim 5, wherein:

a seat for mounting said sensor unit is formed on said end surface at said first end of said housing, a peripheral wall for positioning said sensor unit being disposed so as to stand at an outer circumferential portion of said seat.

10. The dynamoelectric machine according to claim 5, wherein:

a peripheral wall having a notch for projection of a connector is formed on an end surface at said first end of said housing so as to surround said sensor unit and said connector unit, an end plate being securely fastened to said peripheral wall so as to cover an axial opening of said peripheral wall, and a ring-shaped packing being mounted to said connector unit so as to be pressed by said notch and said end plate.

11. The dynamoelectric machine according to claim 1, wherein:

said sensor unit has an annular sensor core in which teeth are formed at a uniform angular pitch in a circumferential direction and a sensor coil installed in said teeth, said sensor unit being disposed so as to surround said sensor rotor, said sensor rotor being formed with an external shape such that a gap permeance between said sensor rotor and said sensor core changes sinusoidally with angle.

12. The dynamoelectric machine according to claim 11, wherein:

a mounting flange portion is formed integrally on said sensor core.

* * * * *